United States Patent [19]

Trosky et al.

[11] 4,401,192

[45] Aug. 30, 1983

[54] METHOD OF EVALUATING THE PERFORMANCE OF AN ELEVATOR SYSTEM

[75] Inventors: William J. Trosky, Wilkinsburg; Michael C. Buros, Forest Hills, both of Pa.

[73] Assignee: Westinghouse Electric Corp., Pittsburgh, Pa.

[21] Appl. No.: 309,281

[22] Filed: Oct. 6, 1981

[51] Int. Cl.³ .............................................. B66B 3/00
[52] U.S. Cl. .................................. 187/29 R; 364/551
[58] Field of Search ................... 187/29; 364/551, 578

[56] References Cited

U.S. PATENT DOCUMENTS 3,973,648 8/1976 Hummert et al. ................ 187/29 R
4,002,973 1/1977 Wiesendanger et al. ..... 187/29 R X
4,106,593 8/1978 Otto et al. .......................... 187/29 R
4,330,838 5/1982 Yoneda et al. ............... 187/29 R X
4,370,717 1/1983 Hummert et al. ............ 187/29 R X Primary Examiner—J. V. Truhe
Assistant Examiner—W. E. Duncanson, Jr.
Attorney, Agent, or Firm—D. R. Lackey

[57] ABSTRACT

A method of evaluating the performance of an elevator system by using actual elevator traffic conditions as an input to an elevator system simulator. The responses of the actual elevator system and the simulated elevator system to the identical actual traffic conditions are then compared to aid in servicing of the elevator system, or in marketing strategy features for the operative elevator system.

11 Claims, 10 Drawing Figures

UP CALLS—FLOOR 1 TIME (SEC)
JANUARY 29, 1980
6 A.M. – 10 A.M.
25 CALLS PER VERTICAL DIVISION

METHOD OF EVALUATING THE PERFORMANCE OF AN ELEVATOR SYSTEM

BACKGROUND OF THE INVENTION

1. Field of the Invention

The invention relates in general to elevator systems, and more specifically to methods for evaluating their performance.

2. Description of the Prior Art

An elevator system is very complex and its performance is difficult to properly evaluate. Problems and malfunctions in a car controller and/or a system processor or dispatcher may occur which degrade elevator service, but not to a degree which is noticeable to the building owner or tenants. Or, even if poor service is noticed, it is difficult to determine if it is due to an equipment problem, or to unusually heavy traffic, beyond which the elevator system was designed to handle.

With the now common usage of a programmable dispatcher, which permits call answering strategy to be easily changed or modified, certain strategy features may be added to, or deleted from, an existing elevator system, in an attempt to improve elevator service. However, it is difficult to determine just what effect such addition or deletion will have on any specific elevator system, because the building configurations and traffic conditions are unique to each elevator installation.

SUMMARY OF THE INVENTION

Briefly, the present invention relates to new and improved methods for evaluating the performance of an elevator system, which methods aid in servicing elevator systems by accurately checking its operation, as well as aiding in marketing improvements, new features, enhanced strategies, and improved dispatching systems, by providing quantitative data relative to the effect of the change. The new and improved methods include the steps of accurately monitoring and recording both the actual traffic conditions and the elevator system response thereto, of an actual elevator system. The recorded actual traffic conditions are then used as inputs to an elevator system simulator which is programmed to have the same building and elevator system parameters as the building and elevator system in question. If the purpose of the evaluation is to perform a servicing function, a production version dispatcher or system processor, identical to that used by the actual elevator system, is used by the elevator simulator. The responses of the simulated elevator system to the actual traffic conditions are stored. Subjecting the responses of the actual and simulated elevator systems to the identical traffic conditions to like analyses, enables direct comparisons to be made. Significant differences in the comparisons indicates a malfunction, with the specific area of difference directing service personnel to the probable cause of the difference.

If the purpose of the evaluation is to perform a marketing function, the system processor used by the elevator simulator may be the same as that used by the elevator system except for some predetermined change which is to be evaluated for its effect on elevator service. Comparison of the two analyses will give quantitative evidence relative to any improvement in elevator service. In a similar vein, the system processor used by the simulator may be entirely different than that used by the elevator system, such as when a new strategy is being marketed. Conjecture as to whether or not this new strategy would improve elevator service for a specific building is eliminated, as the actual building traffic conditions are input to the new strategy, and a direct and unequivocal comparison of the new strategy with the old strategy may be made.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

Figure 1:
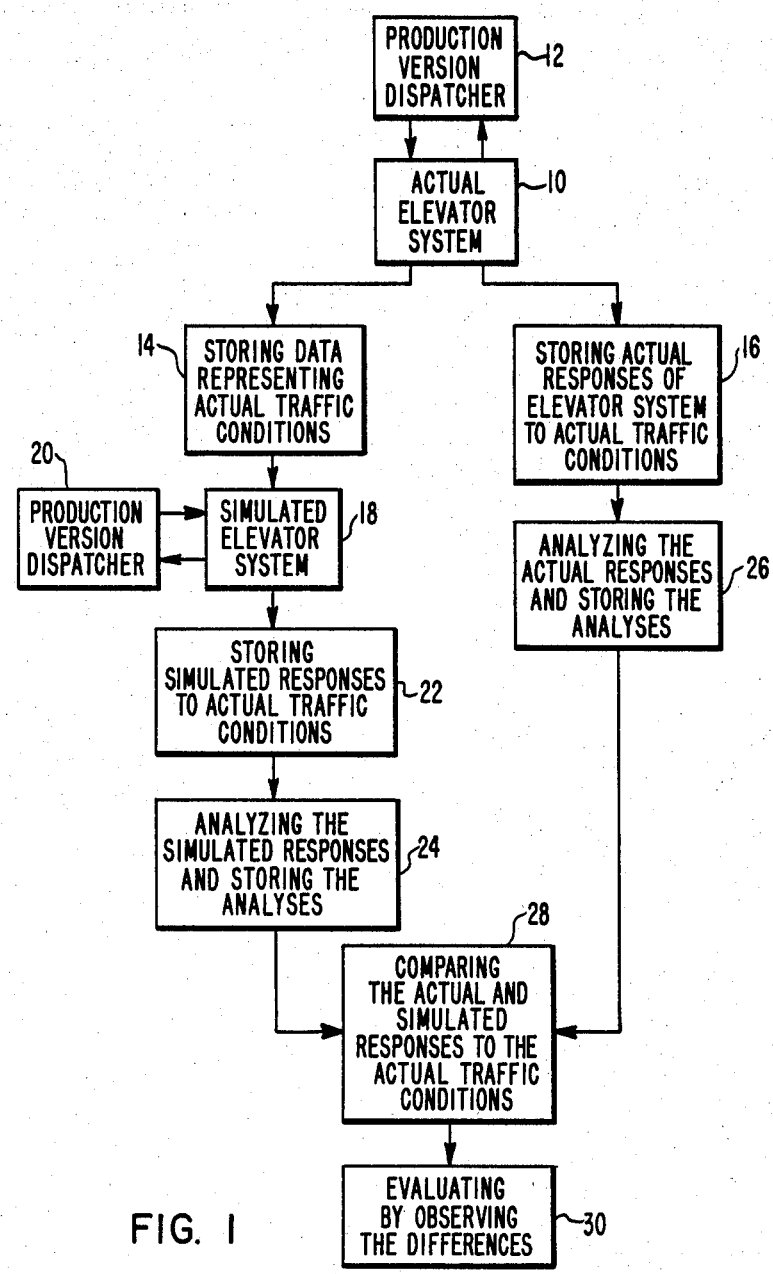
FIG. 1 is a block diagram which sets forth the new and improved method of evaluating the performance of an elevator system.

Referring now to the drawings, FIG. 1 is a block diagram which sets forth a new and improved method of evaluating the performance of an actual elevator system 10 having a plurality of elevator cars under the supervision of group supervisory control 12. The group supervisory control 12 may be a programmable processor which performs the functions of allocating and assigning hall calls to the various elevator cars according to a predetermined strategy. Since the group supervisory control 12 dispatches the elevator cars, it is also referred to as a "production version" dispatcher.

A first step of the method, shown at block 14, includes the steps of monitoring and storing data representative of actual elevator traffic conditions. The actual traffic conditions include the up and down direction hall calls, and the time of day when each call was registered. The actual traffic conditions also include each car's car calls, the time of day of their entry, the floor position of the car at the time of entry, and the destination floor. Another important traffic condition includes the fact of any car being taken out of service, the time of day at which the car went out of service, and the time of day at which it was returned to service.

Another step of the method, shown within block 16, includes the steps of monitoring and storing data representative of the actual response of the elevator system 10 to the actual traffic conditions. The actual response includes the length of time each hall call was registered before it was reset by its being served by an elevator car. Other responses of the elevator system indicative of how the dispatcher and various car controllers are functioning include the positions of the elevator cars, including the time each elevator car spends at a specific floor, such as the main or lobby floor. The time each car is idle or available to serve calls is also a valuable elevator system response to be monitored and stored.

A real time elevator system simulator 18 is also provided, which, in cooperation with a production version dispatcher 20, simulates the operation of an elevator system in response to traffic conditions applied thereto as inputs. The operation of the simulated elevator system is visually displayed in real time, such as on a video display, and the response of the elevator system is stored in memory and printable in predetermined formats to provide a hard copy of the performance.

Certain constants associated with the specific elevator system to be simulated, are entered into the appropriate locations in the software of the dispatcher 20. This function may be provided by a keyboard. These initial conditions set forth, among other things, the number of elevator cars in the bank of cars, parameters associated with the specific building, such as the number of floors, the distance between the floors, and special features such as the number of basement floors, the number of top extension floors, express zones, if any, convention floors, the lobby or main floor level, a restaurant floor, and the like.

Since the elevator bank simulation system 18 is a real time simulator, certain parameters related to the elevator system to be simulated are entered into the software package of the simulator 18. These constants include the movement of the elevator cars with respect to time, such as the rate of acceleration and the maximum velocity of the cars. Timer settings are also entered into the program, such as the door opening time, the normal door non-interference time, the door closing time, and the values for system timers used to time events which may initiate predetermined dispatcher controlled strategies.

The dispatcher 20 operates in the same manner as if it were communicating with the car controllers of a bank of elevator cars. The simulator 18 functions as the car controllers for the bank of cars, receiving car assignments for the various cars, providing car status signals for the dispatcher 20, and simulating car motion of the various cars in the associated building, which motion is displayed on the associated display panel.

The next step of the method applies the data stored in step 14, which data is representative of the actual elevator traffic conditions, to the input of the simulated elevator system 18. The same hall and car calls are set at the same relative times of the day, and the cars are taken out of service, and returned to service, at the same relative times as they are in the elevator system 10. Any period of time may be selected, such as a 24 hour period or any selected portion thereof. Step 22 includes the steps of monitoring and storing data representative of the responses of the simulated elevator system 18 to the actual traffic conditions, and storing the same types of data, using exactly the same format, as step 16.

Step 24 analyzes the response of the simulated elevator system, and step 26 analyzes the response of the actual elevator system, to the same actual traffic conditions. These two steps use the same programs and printing formats.

Step 28 then compares the responses of the simulated and actual elevator systems, with step 30 evaluating the performance of the actual elevator system 10 by observing and classifying any differences between the responses.

If the purpose of the evaluation is to perform a servicing function, the production version dispatcher 20 chosen for use with the simulation system 18 would be the same as the production version dispatcher 12 which is controlling the elevator system 10. Thus, the responses compared in step 28 should result in insignificant differences, if the dispatcher 12 and the elevator system 10 are functioning properly. Significant differences which indicate poorer service by the actual elevator system 10 than by the simulated elevator system 18 indicates a malfunction. The cause of the service degradation may be immediately apparent from the analyses which have been prepared. For example, per car malfunctions may be noted by comparing idle times and main floor times. Per floor malfunctions may be noted by determining if the service degradation is general, or specific to a predetermined floor, or group of floors. A general service degradation indicates a dispatcher malfunction. A dispatcher malfunction which appears only at a specific time of day indicates that a strategy feature which should become effective at that time of day, i.e., morning up peak, or evening down peak, is not functioning properly.

Figure 2:
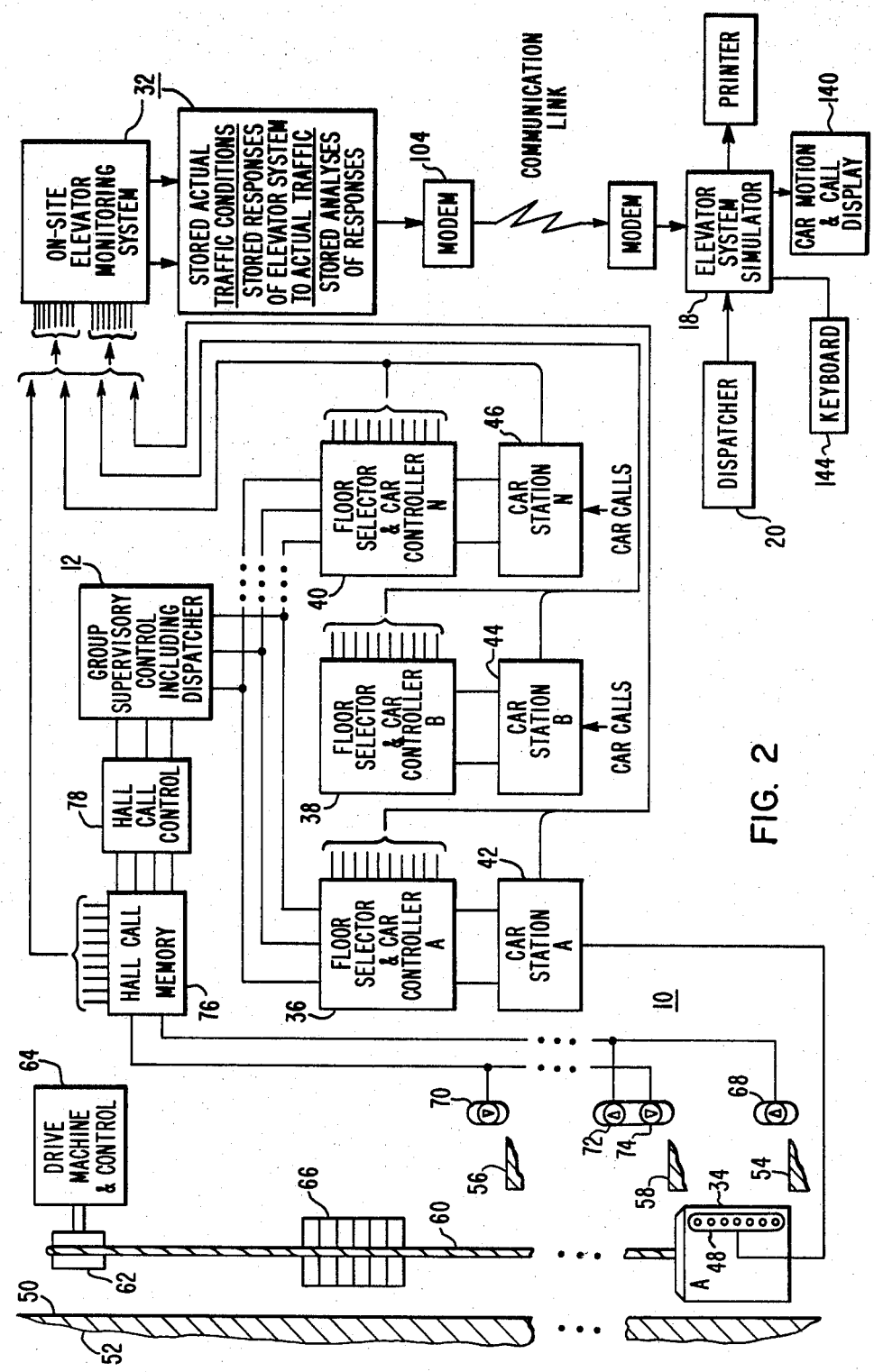
FIG. 2 is a partially schematic and partially block diagram of an elevator system, including on-site monitoring and remote simulation, which may utilize the evaluation methods of the invention.
Figure 3A:
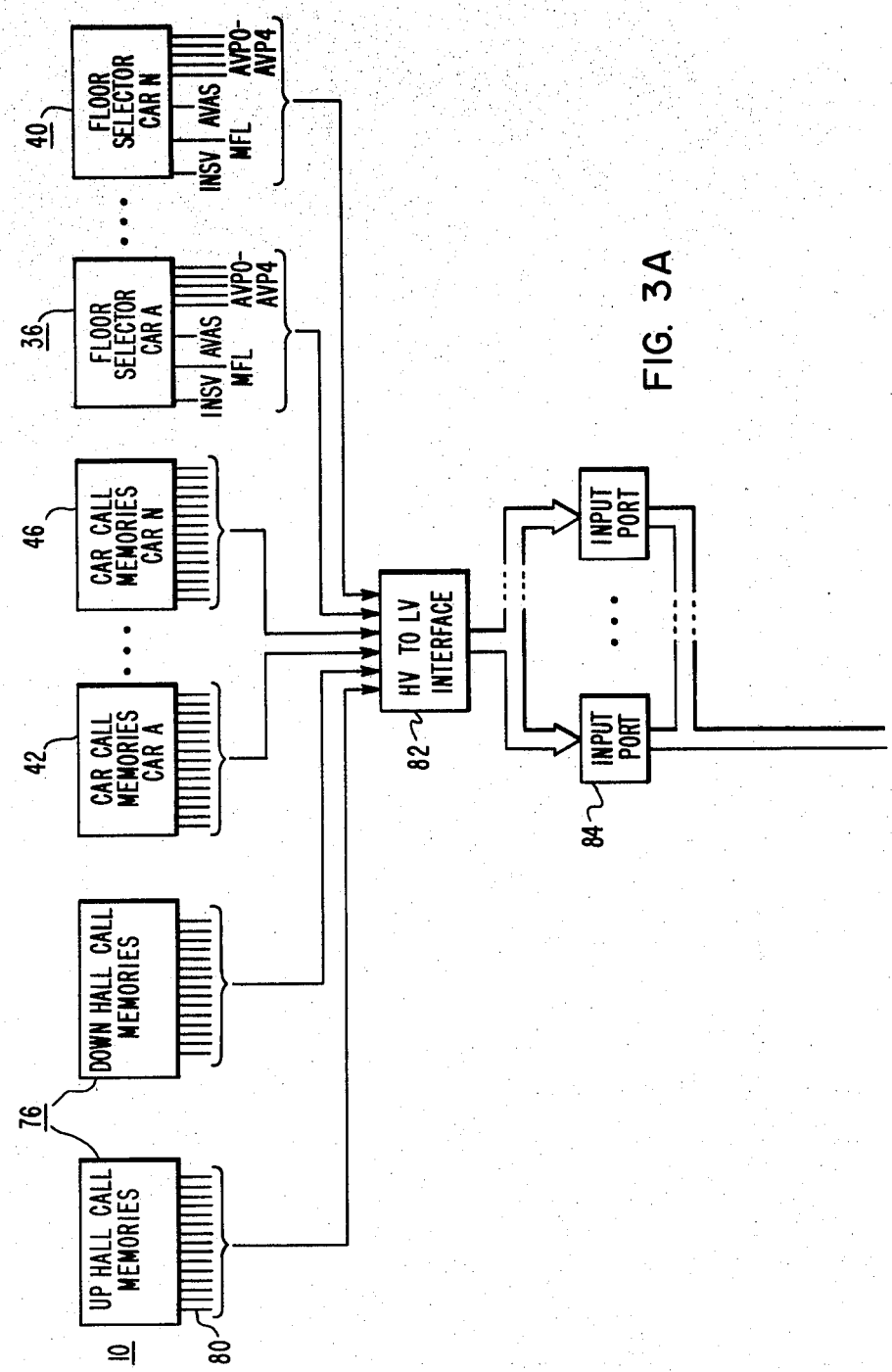
FIGS. 3A and 3B may be assembled to provide a more detailed diagram setting forth an arrangement which may be used to practice the methods of the invention.
Figure 3B:
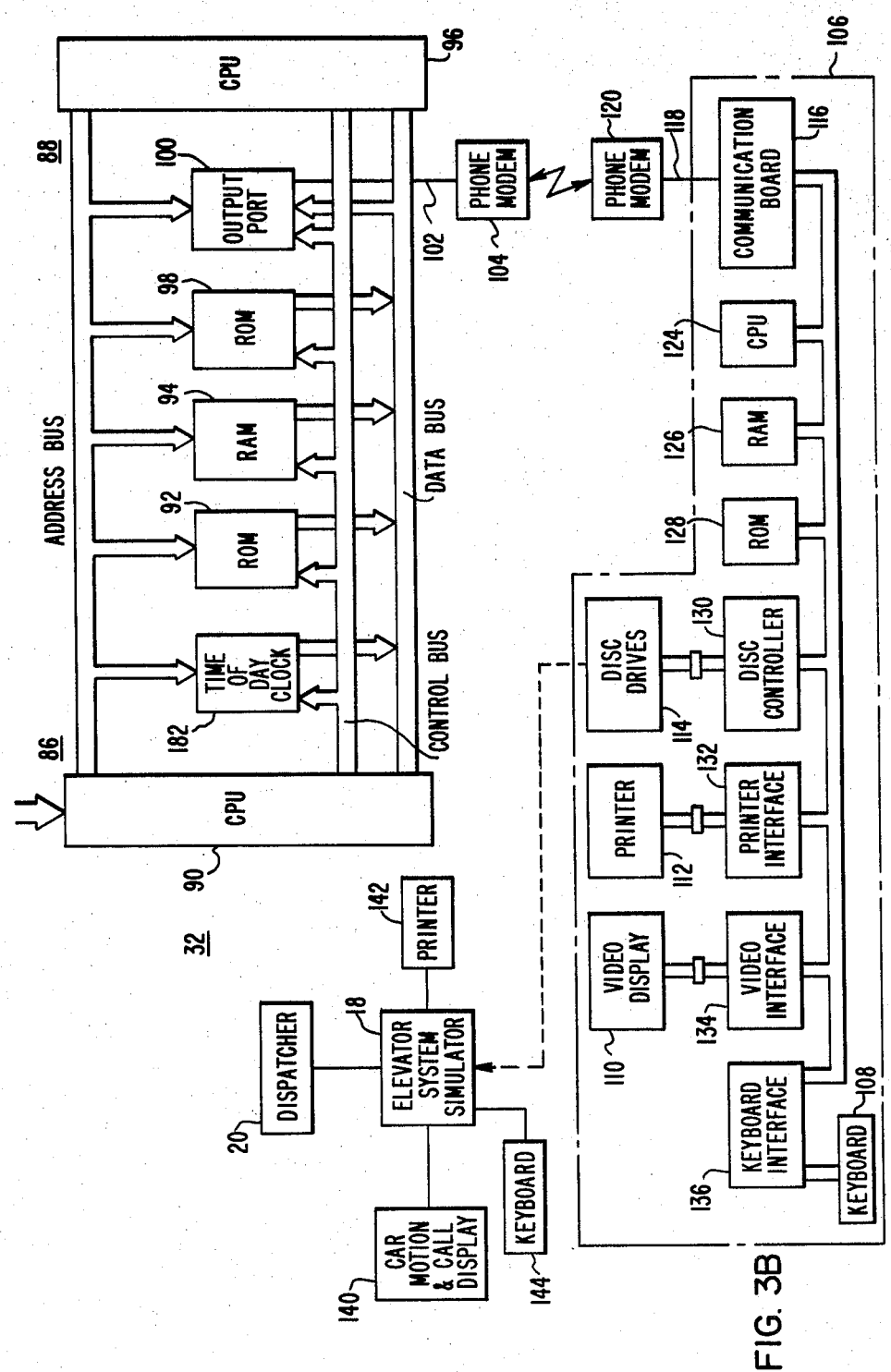

Apparatus suitable for performing the new and improved elevator system evaluation methods will now be described, with FIG. 2 setting forth a block diagram of an actual elevator system 10 which may be used for that shown in block 10 of FIG. 1. FIGS. 3A and 3B collectively set forth a more detailed showing of certain of the functions shown in FIG. 2.

More specifically, elevator system 10 is monitored by on-site monitoring apparatus 32. Since the specific details of the elevator system being monitored are immaterial, elevator system 10 is shown in block form. U.S. Pat. Nos. 3,256,958; 3,741,348; 3,902,572 and 4,007,812 all set forth relay-based elevator systems which may be monitored, for example. U.S. Pat. Nos. 3,750,850; 3,804,209 and 3,851,733 collectively set forth a solid-state elevator system which may be monitored. All of these U.S. patents are assigned to the same assignee as the present application and they are hereby incorporated by reference to illustrate operative elevator systems which may be monitored.

For purposes of example, it will be assumed that the elevator system 10 being monitored is relay based, and that the monitoring system is microprocessor based, thus requiring a 125-volt D.C. to 5-volt D.C. interface between the elevator system 10 and monitoring apparatus 32.

Elevator system 10 includes a plurality of elevator cars under group supervisory control. The elevator cars may be hydraulically driven, or they may be of the electric traction type. For purposes of example, the controls A, B and N of a traction elevator system are illustrated, with only elevator car 34 associated with control A being shown, as the other elevator cars would be similar. The elevator controls A, B and N each include a floor selector and car controller 36, 38 and 40, respectively, mounted remotely from the associated elevator car, such as in a machine room. The elevator controls A, B and N also include car stations 42, 44 and 46, respectively. Each car station includes a push button array inside an elevator car for registering car calls, such as an array 48 illustrated in elevator car 34.

The elevator cars are mounted for movement in a building to serve the floors therein. For example, elevator car 34 is mounted in a hoistway 50 of a building 52 having a plurality of floors or landings, with only the lowest floor, referenced 54, the highest floor, referenced 56, and one intermediate floor, referenced 58, being shown in FIG. 1. For purposes of example, it will be assumed that the building 52 has 16 floors or landings.

Elevator car 14 is supported by a plurality of wire ropes, shown generally at 60, which are reeved over a traction sheave 62 driven by a traction drive machine 64. A counterweight 66 is connected to the other ends of the ropes 60.

Hall calls from each of the various floors are registered by push buttons mounted in the hallways adjacent to the floor openings to the hoistway. For example, the lowest floor 54 includes an up-direction push button 68, the highest floor 56 includes a down-direction push button 70, and the intermediate floor 58 includes both up and down push buttons 72 and 74, respectively. Up and down hall calls are sent to a hall call memory 76, which memorizes the calls until they are reset, and it further "sends" the calls to hall call control 78. Hall call control 78 "sends" the hall calls to the group supervisory control 12.

The group supervisory control 12, using information provided to it from the various elevator cars relative to their positions and activity level, determines the allocation or assignment of the hall calls to the cars, according to a predetermined operating strategy.

Monitoring apparatus 32 monitors predetermined traffic conditions, and predetermined responses of the elevator system 10 to the traffic conditions, on a continuous, 24-hour-a-day basis. As shown in FIGS. 3A and 3B, the monitoring apparatus 32, which is preferably portable, is located at the elevator site during the monitoring period.

Monitoring apparatus 32 includes a plurality of electrical leads 80 suitable for connection to elevator control elements, and ground leads. For purposes of example, the electrical leads 80 are illustrated as being connected to monitor the up and down hall call memories 76, such as hall call relays, the car call memories, such as may be located in the associated car station, or in the associated car controller, and for monitoring certain of the relays in the floor selector of each elevator car. For example, it may monitor the idle or available car relay AVAS, the main floor relay MFL, the in-service relay INSV, and it monitors the car position. The car position may be prepared in binary form from a relay-type selector by using a diode matrix.

The electrical leads 80 are attached to interface boards, shown generally at 82, which convert the 125-volt D.C. of the relay-based elevator system 10 to 5 volts D.C. for use by the monitoring apparatus 32. If the control of the elevator system 10 is of the solid state type operating with the same voltage level as the monitoring apparatus 32, the voltage interface boards 82 would not be required.

The low-voltage outputs of the interface boards 82 are brought out to a plurality of 8-bit input ports 84, such as Intel's 8212, with these input ports being monitored for a change in a voltage level of any one of the electrical leads.

In a preferred embodiment of the invention, the monitoring of the input ports is performed by a dedicated microprocessor, and a second microprocessor utilizes the data collected by the first microprocessor to store information as well as to analyze it. It is to be understood that the first microprocessor may be eliminated, if desired, with hardware interrupts being used to signify an input change, or, the second microprocessor may be additionally programmed to periodically check the input ports for a signal change.

More specifically, in the preferred embodiment, a first microprocessor 86 monitors the input ports, and a second microprocessor 88 processes and analyzes the data as it is updated by the first microprocessor 86. The first microprocessor 86 includes a CPU 90, such as Intel's 8085A, which includes a clock generator and system controller on the same chip, a ROM 92, such as Intel's 8755A/8755A-2 16,384-bit EPROM with I/O, and a RAM 94, such as Intel's 8156, which includes I/O ports and a timer. CPU 90 detects a change in a signal at an input port and stores the change in RAM 94. The second CPU 88 maintains and updates an image of the input ports, so it can tell when a change occurs.

The second microprocessor 88 shares RAM 94 with the first microprocessor 86. It additionally includes a CPU 96, which may be Intel's 8085A, a ROM 98, which may be Intel's 8755A/8755A-2, and an output port 100, such as Intel's 8212. Output port 100 is connected to a conventional phone modem 104 via an RS232 serial data link 102. The first and second microprocessors 86 and 88 may be mounted on Intel's 80/24 boards.

Monitoring means 32 stores the traffic, response data, and analyses of the response data, in RAM 94. The on-site data analysis may be used to reduce the total amount of performance data which is stored during the monitoring period. The stored data may be retrieved on-site via a portable computer, such as an APPLE II, and taken to the elevator simulation system 18. In a preferred embodiment, the data is retrieved over the telephone by simply calling the phone modem 104 and entering a valid user name and password. This communication may be via the touch-tone keyboard on a touch-tone phone, or via a hand-held tone generator when the telephone is of the dial type.

Once communications have been established with the on-site monitoring system 32, all the data can be read and transferred to magnetic disc, for example. The data at this point is analyzed, formated and printed to show waiting times, building parameters, etc. Data of interest may be selected from a menu and listed on a video display and/or a hard copy unit. This menu selection will allow the previewing of various data, enabling printouts to be requested of only those areas of specific interest.

As hereinbefore stated, the data may be retrieved on-site with an APPLE II. The APPLE II may also be used at the remote location in a telephone retrieval system, as a communication interface between the telephone system and the elevator system simulator 18. This embodiment is set forth in FIG. 3B, with the communications interface or APPLE II being shown within the broken outline 106.

The APPLE II incorporates an integral keyboard 108, and the desired auxiliary devices, such as a video monitor 110, a printer 112, and disc drivers 114. The APPLE II includes a communication board 116 connected to a RS 232 serial data link 118, and the data link 118 is connected to a phone modem 120. The APPLE II also includes a CPU 124, a RAM 126, a ROM 128, a disc controller 130 for disc drivers 114, a printer interface 132 for printer 112, a video interface 134 for video monitor 110, and a keyboard interface 136 for the keyboard 108.

An elevator system simulator which may be used for the simulation system 18 is described in detail in U.S. Pat. No. 4,370,717, Ser. No. 510,940, filed Sept. 30, 1974, entitled "Elevator Bank Simulation System", and this application is hereby incorporated into the present application by reference. Thus, the simulator 18 need not be described in detail. It is sufficient to say that the actual elevator traffic conditions obtained by the monitoring system 32 and sent to communication interface 106 for storage in the magnetic disc associated with disc drivers 114, are applied as inputs to the elevator system simulator 18. The elevator system simulator, in response to the traffic inputs and operating parameters, such as car in-service signals, operates in conjunction with the production version dispatcher 20 to visually display on a suitable display 140 hall and car calls, assignments of the calls to the various cars by the dispatcher, car movement in serving the calls, and the cancellation or resetting of the calls as they are served. The elevator system simulator collects and analyzes elevator system performance data, in a format similar to that of the on-site monitoring apparatus 32, and selected data and analysis thereof may be printed by a printer 142 in response to requests for data entered via a suitable keyboard 144.

Figure 4A:
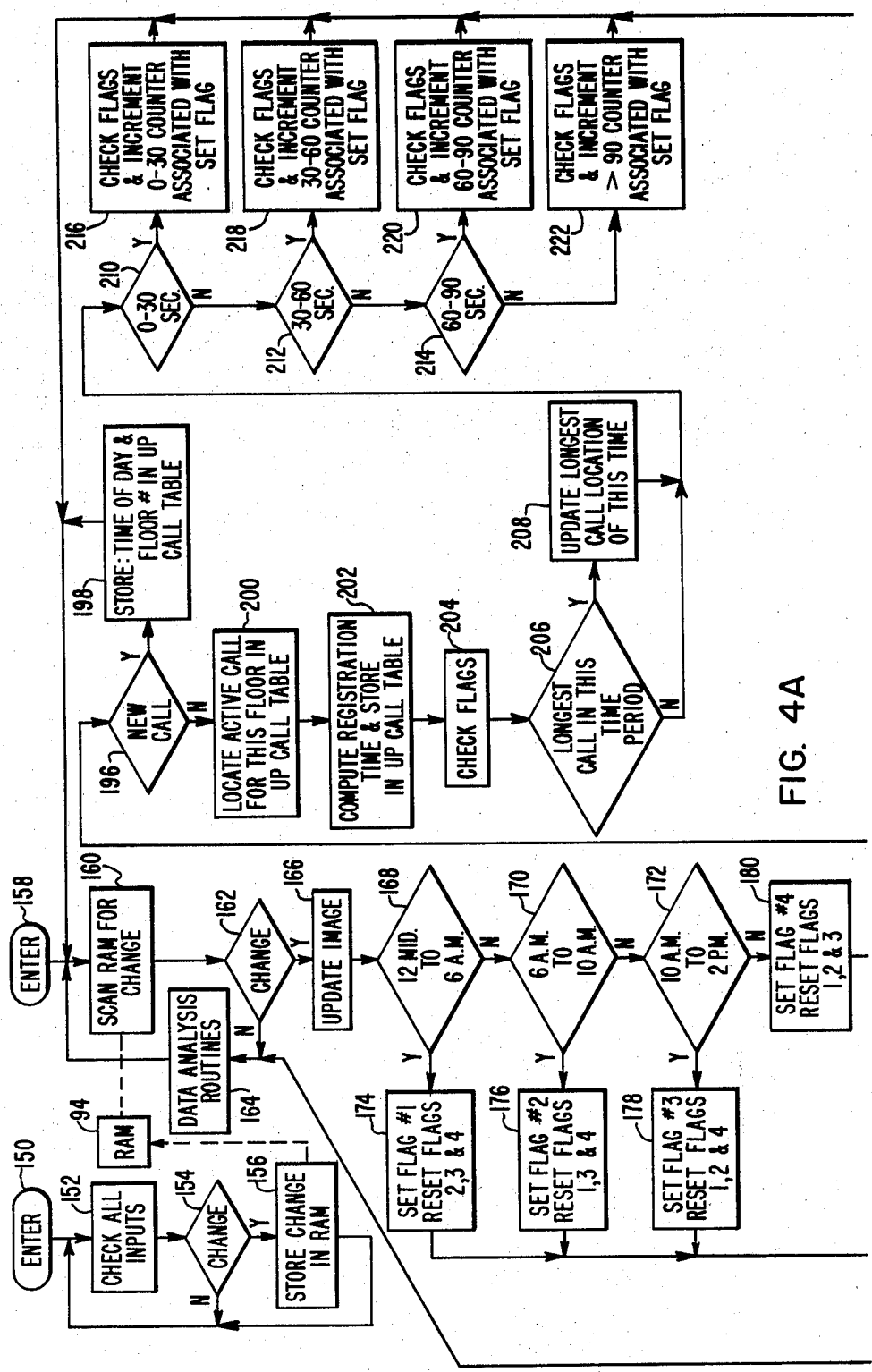
FIGS. 4A and 4B may be assembled to set forth a flow chart of a program which may be used to collect and store elevator traffic conditions, as well as the responses of the elevator system, and the elevator system simulator, in serving the traffic.
Figure 4B:
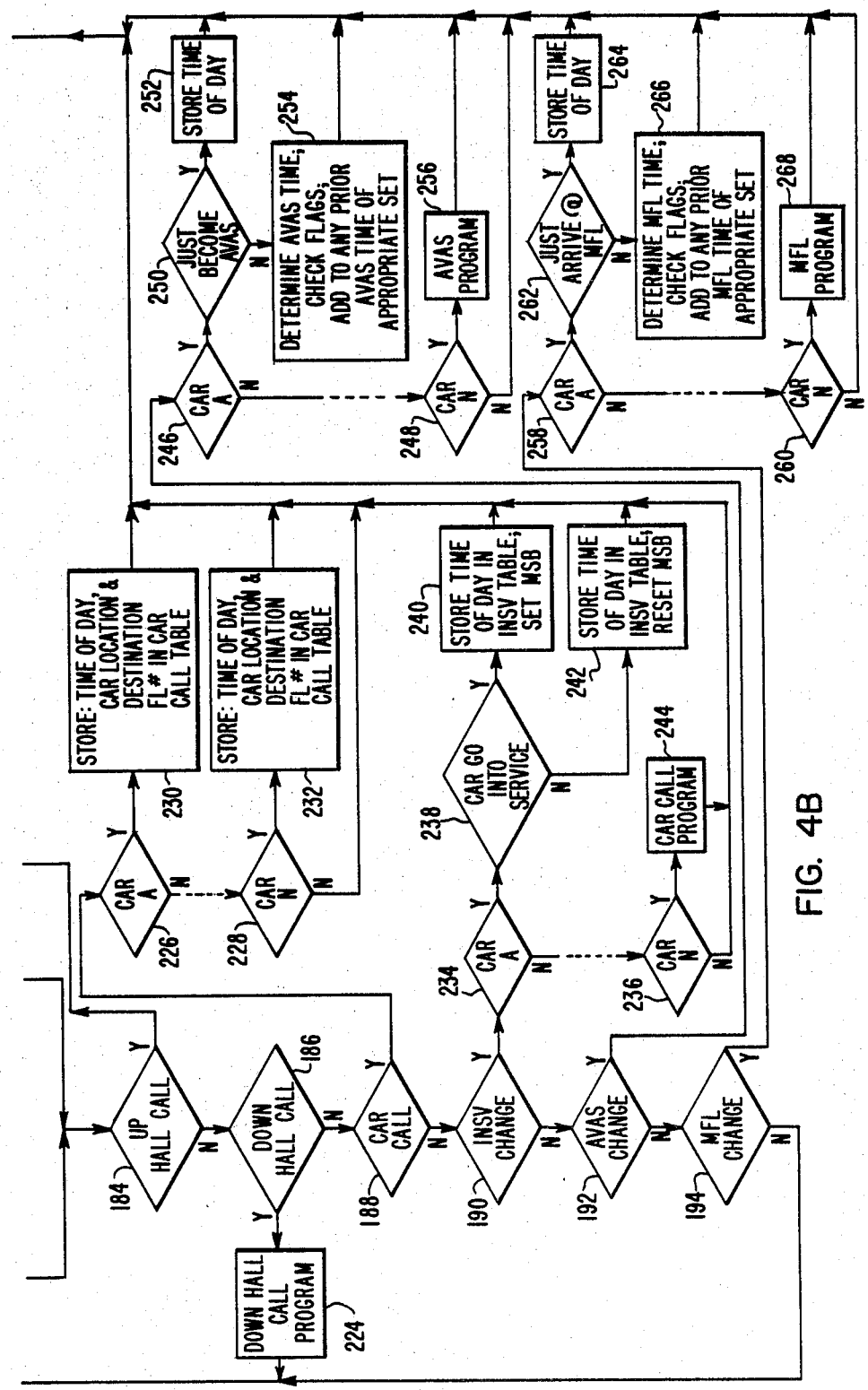

FIGS. 4A and 4B may be assembled to provide a flow chart of a program which may be used by monitoring apparatus 32 to collect traffic data, collect performance data, and to perform predetermined analyses on the performance data. A similar program, except deleting the traffic collection portion, may be used by the elevator system simulator 18 to perform the analyses on the simulated performance data generated by the simulator 18.

More specifically, the program followed by microprocessor 86 is entered at 150 and it sequentially addresses the input ports 84 in step 152. After each port is addressed, step 154 determines if there has been a change in the voltage levels of the various inputs at this port since the last reading thereof. It maintains an image of the input ports for comparison with the actual input ports, in order for it to detect such a change. If there has been no change, the program returns to step 152 and it stays in this checking loop until step 154 detects a change. Step 156 stores any change in the common RAM 94, to provide an up-to-date image of the input signals.

Microprocessor 88 follows a program which starts at 158, and step 160 scans the image of the input ports in RAM 94. Step 162 determines if an input port has changed since the last scan. If not, the program can perform some data analysis, shown generally at 164, before looping back to step 160. If a change occurs, step 166 updates its own image of the input ports which it maintains for comparison with the image maintained by microprocessor 86.

For performance analysis purposes, the user may wish to group data from different time periods of a 24 hour day. The specific time periods are programmable and entered by the user. For purposes of example, it will be assumed that four time periods are selectable, with each time period being given a set number. For example, these four time periods and sets may be as follows:

Set No. 1—12 Midnight to 6 A.M.
Set No. 2—6 A.M. to 10 A.M.
Set No. 3—10 A.M. to 2 P.M.
Set No. 4—2 P.M. to Midnight The program, upon detecting a change and updating the image of the input ports, may thus enter a program portion at step 168 which sets a flag according to which of the sets the present time of day falls into. The program flags are maintained in RAM, as shown in the RAM map of FIG. 5. Four flags numbered the same as the sets may be used, with steps 168, 170 and 172 comparing the time periods of the various sets with a time-of-day clock 182 shown in FIG. 3B. Steps 174, 176, 178 and 180 set and reset the appropriate flags.

After classifying the present time of day, the program successively checks the various kinds of changes which may occur, in order to determine which program portion to branch to in order to correctly process the detected change.

For example, the change may be the entering or resetting of an up hall call, which change is checked at step 184. The change may be the entering or resetting of a down hall call, which is checked at step 186. The change may be the entering or resetting of a car call in any of the elevator cars, which change is checked in step 188. The change may be a car going into or out of service, which is checked at step 190. The change may be a car changing its status from "busy" to "idle", or vice versa, which is checked at step 192. The change may be the car arriving at, or leaving, a predetermined floor, such as the main floor, which is checked at step 194. Any other changes that it is desired to detect may be added to this string of checking steps. For example, if a car door is held open by a passenger beyond the normal noninterference time, this occurrence may trigger a voltage level change which is detected. The time of day of this unauthorized holding of the door, as well as the length of time the door is held beyond the normal time, may be recorded and fed into the elevator system simulator as a traffic parameter.

If step 184 finds that the detected change is related to an up hall call, the program branches to step 196 which determines if the change is the registration of a new up hall call, or the resetting of an old hall call. If step 196 finds that it is a new up hall call, the program advances to step 198 which stores the time of day and the associated floor number in a call table shown in the RAM map of FIG. 5. If separate up and down hall call tables are maintained, it would store this information in the up hall call table. If a single table is maintained, it would simply set a specific bit in the storage space for this call to indicate that it is an up hall call. Step 198 then returns to step 160. When step 196 finds that the change indicates the resetting of an up hall call, the program branches to step 200 which locates the active call for this floor in the call table. Step 202 computes the registration time, i.e., the time required to serve the call, and this registration time is stored in the up hall call table. The registration time may conveniently be recorded by dividing a 24 hour day into 96 15-minute time intervals, numbered 0–95. The time of day may thus be represented by the number of a timing interval plus the number of seconds into the next 15-minute timing interval. Step 204 checks the flags to see which user defined portion of the day the call occurred, and step 206 checks to see if this is the longest call so far during this time period. If step 206 finds that it is the longest call, step 208 updates the longest call location in RAM for this specific time period. Similar steps may perform the same function for the 15-minute time intervals. Certain analyses may be immediately performed on this call by classifying it as to waiting time, and by adding it to the count of the number of calls which fall within its waiting time class. For example, steps 206 and 208 may both advance to a step 210 which checks to see if the call registration time was within 0–30 seconds. If not, the program advances to step 212 which checks to see if the call registration time was within 30–60 seconds. If not, the program advances to step 214 which checks to see if the registration time was within 60–90 seconds. If step 210 found that the call time was within 0–30 seconds, it would advance to step 216 which checks the flags and which also increments a "0–30" counter associated with the set flag. If step 212 found that the call registration time was within the 30–60 bracket, step 218 would check the flags and increment a "30–60" counter associated with the set flag. If step 214 found the registration time within 60–90 seconds, step 220 would check the flags and increment a "60–90" counter associated with the set flag. If step 214 found that the time exceeded 90 seconds, a step 222 would check the flags and increment a "greater than 90" counter associated with the set flag.

If step 186 finds that the detected change is related to a down hall call, the program advances to the down hall call program 224, which may be the same as steps 196 through 222, and thus down hall call program 224 need not be described in detail.

If step 188 finds that the detected change is related to the entry or resetting of a car call, the program advances to a group of program steps which determines which car is associated with the change, i.e., step 226 checks car A, and a plurality of like steps check the remaining cars, with step 228 checking the last car N. If the change is associated with car A, step 230 stores the time of day, the location of the associated elevator car, and the destination floor, in the car call table. A car call table is maintained in RAM 94 for each elevator car, with a suitable format for car A being shown in the RAM map of FIG. 5. The time of day of the car call entry is important, as it enables car calls to be placed at the same relative times of the day in the elevator simulation system as they were entered in the actual elevator system. Steps similar to step 230 perform a similar function for the other cars, with step 232 performing this function for car N.

If step 190 finds that the detected change involved a change in the ability of the car to serve elevator traffic, steps 234–236 check the various cars to determine which car is associated with the change. If car A is the car associated with the change, step 238 checks to see if car A went into or out of service. If car A went into service (INSV=1), step 240 sets the MSB and stores the time of day in the next empty 16-bit location of an INSV table shown in the RAM map of FIG. 5. If the car went out of service, step 242 stores a zero at the MSB and stores the time of day in the next empty 16-bit word location of the table. Thus, a logic one in the MSB of each 16-bit word indicates that the associated time entry indicates the car went into service at this time, and a logic zero in the MSB indicates the car went out of service at the time indicated in the remaining portion of the word. It is important to know precisely when each car goes into and out of service, as opposed to just recording the total out-of-service time, as the specific time that a car is out of service can make a tremendous difference in the quality of elevator service. For example, if a car is out-of-service at 9 A.M., service will be seriously degraded, while if it goes out of service at 6 P.M., the elevator service may not be adversely affected at all.

Figure 5:
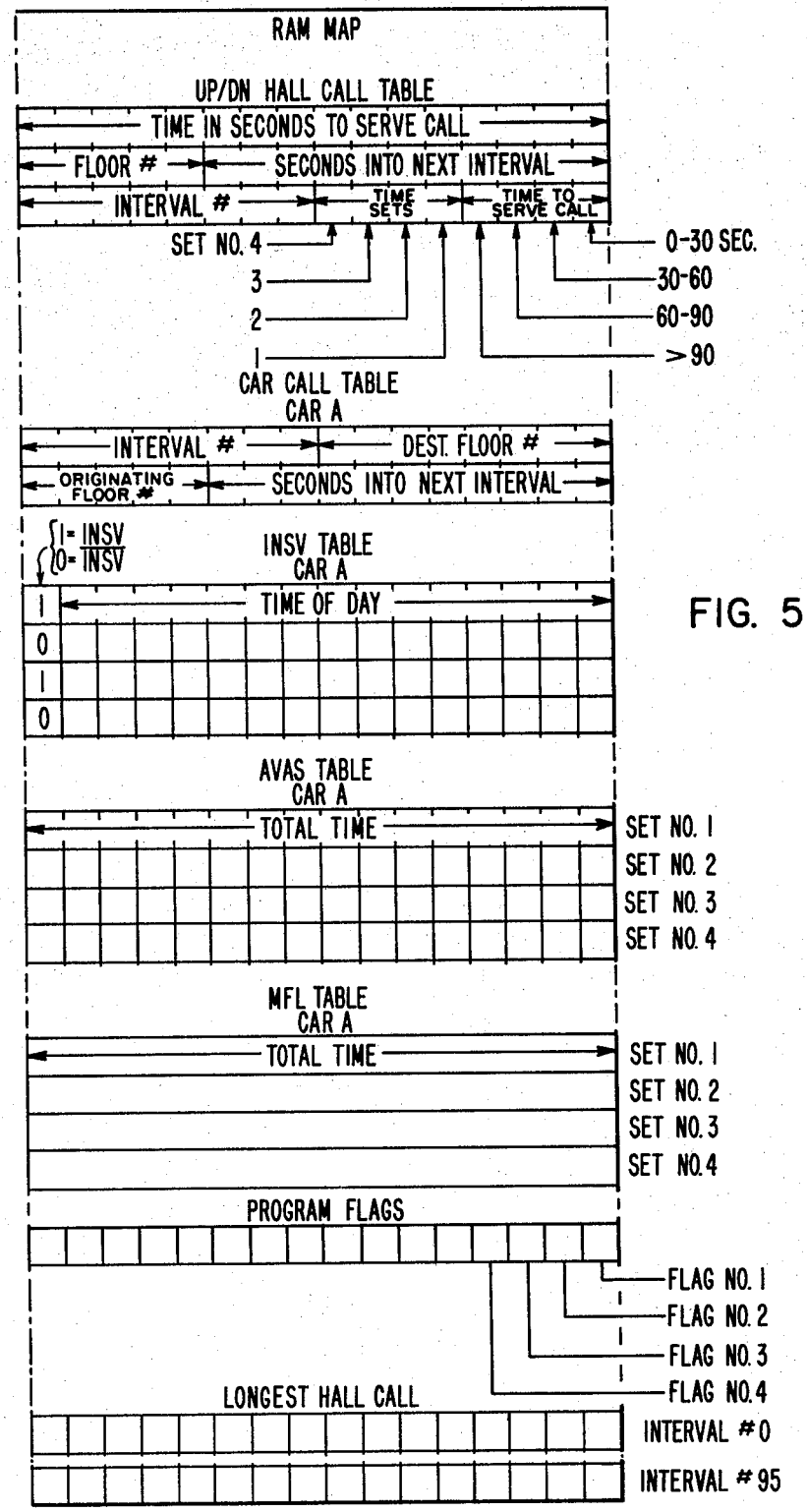
FIG. 5 is a RAM map setting forth various tables and flags which are maintained in RAM by the program shown in FIGS. 4A and 4B.

If step 192 finds that the detected change involved a car changing from a busy to an idle status, or vice versa, its availability relay will pick up, or drop out, respectively, to signify this fact. Steps 246 through 248 check the cars to see which one provided the signal. If it was car A, for example, step 250 checks to see if car A just became available (AVAS=1), or if it just changed from being available to become a busy or assigned car (AVAS=0). The availability of a car is a "response", and not a traffic condition, and thus it is not important to know the precise time of day when a car becomes available, or when it becomes busy. The total time that a car is available or idle during a specified time period is an important criterion, however, and can be used to indicate a malfunction in the car controller, or in the dispatcher, if the car is idle for excessive periods of time in comparison with the simulated elevator system. Thus, if step 250 finds the elevator car just became available, step 252 stores the time of day in a temporary location. When the car subsequently becomes a busy or assigned car, step 250 will branch to step 254 to determine the time the car was available by using the present time of day and the time of day stored during step 252. Step 254 checks the flags to determine the particular time period or set, and it adds the availability time just computed to the prior availability time stored in an AVAS table in RAM. FIG. 5 shows a suitable format. If car N, for example, changed its availability status, step 248 branches to an AVAS program 256, which may be the same as steps 250, 252, and 254.

If step 194 finds that the change involved a car arriving at, or leaving, a predetermined floor, such as the main or lobby floor, the car's main floor relay MFL will pick up, or drop out, respectively. Similar to the availability status, it is only important to know the total time spent by an elevator car at this floor, during a specified period of time. Accordingly, when step 194 detects a change in a main floor relay, steps 258 through 260 determine the car which caused the change. If it was car A, for example, step 262 checks to see if car A just arrived at the main floor. If so, step 264 stores the time of day in a temporary location. When the car subsequently leaves the main floor, this change will be detected and the program will again arrive at step 262, which will now advance to step 266 to determine the elapsed time. The elapsed time is added to prior main floor time accumulated by this car during the current time set, as directed by the flag which is set. If this change involved car N, for example, step 260 would advance to a main floor program 268, which may be similar to steps 262, 264 and 266.

FIG. 5, which has been hereinbefore referred to, is a RAM map which illustrates suitable formats for storing various traffic conditions and elevator system responses. For example, the up and down hall call programs utilize hall call tables for storing various parameters relative to each call. The floor number is recorded, the time of day when the call was registered is recorded, the total time in seconds to serve the call is recorded, the time set in which the call falls is recorded, and the time to serve the call may be placed in one of a plurality of several time categories, such as 0–30 seconds, 30–60 seconds, etc. Separate tables for up and down calls may be maintained, or a single table may be maintained with a specific bit being set to a one for an up hall call, and to a zero for a down hall call.

FIG. 5 also includes a car call table for each car, storing the floor number at which the passenger entered the car and placed the call, the destination floor selected by the passenger, and the time of day at which the car call was placed. FIG. 5 also includes the INSV, AVAS and MFL tables, and program flags. It may also store the longest hall call for each of the 96 fifteen-minute intervals in a 24-hour-a-day, or it may shorten the memory space required by just storing the longest call during user specified busy periods of the day.

Figure 6:
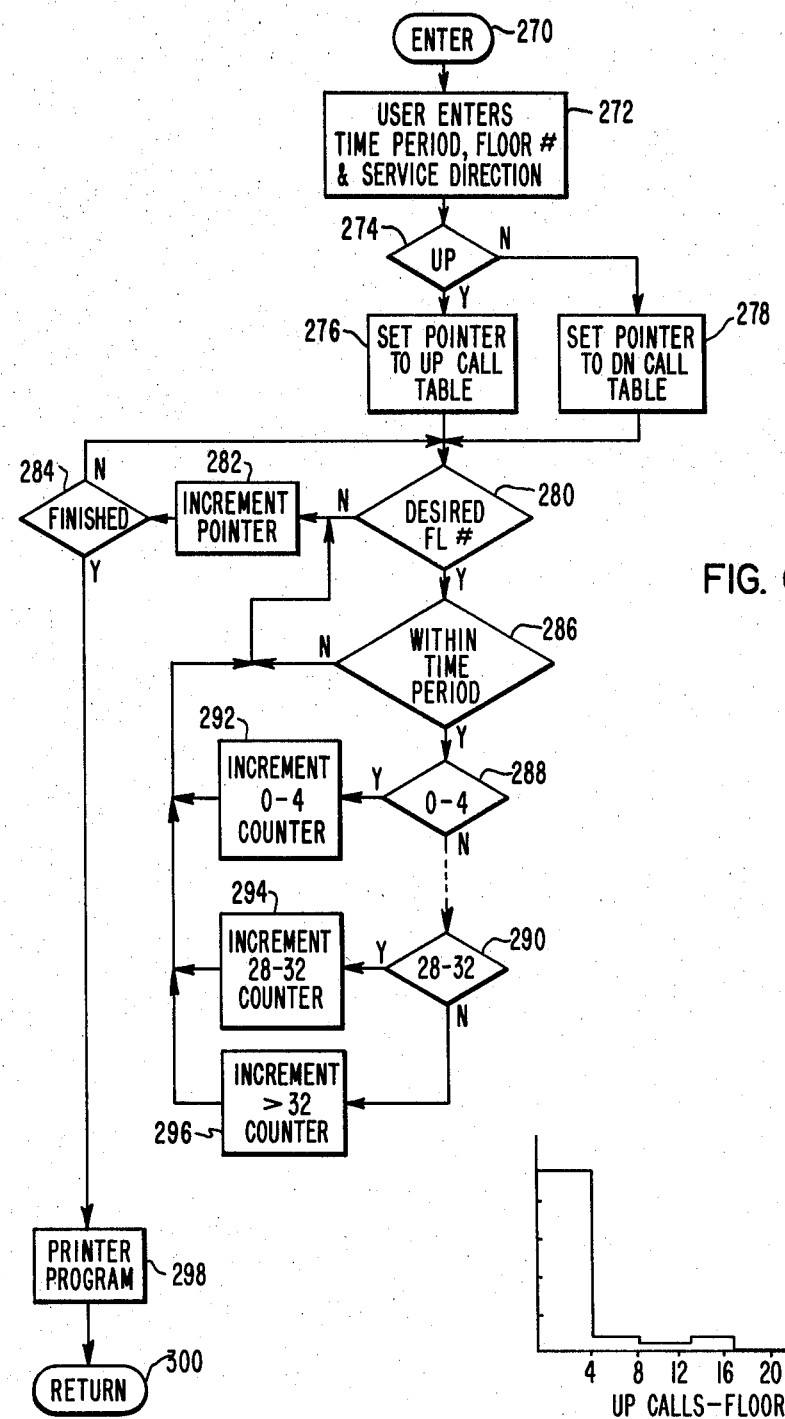
FIG. 6 is a flow chart of a program for preparing a first predetermined analysis of hall calls which may be used to analyze the hall calls of both the actual and simulated elevator systems.

Step 164 in FIG. 4A analyzes data and stores it in RAM in a predetermined format which may be viewed on a CRT screen and/or printed to provide a hard copy of the analysis. FIG. 6 illustrates a flow chart for an exemplary analysis which may be made. This analysis may be made automatically for each service direction for each floor of the building, it may be automatically performed only for certain floors and selected service directions, or it may perform the analysis upon command for a selected floor and service direction, which is input by the user via a keyboard.

The program shown in FIG. 6 is entered at 270 and step 272 checks the defined parameters, such as the period of time over which the analysis is to be made, and whether or not all of the floors and service directions are to be analyzed, or just a specific floor and service direction. For purposes of example, it will be assumed that this program is for a user defined specific time period, floor number, and service direction. Thus, the program advances to step 274 and checks to see if the up or down service direction has been selected. If the up service direction is selected, the program advances to step 276 which sets a pointer to the up hall call table in RAM. If only one hall call table is utilized for both the up and down hall call, step 276 would initialize the program to check the bit of the call word which indicates the service direction, and to only select those with the logic one at this location, which indicates an up hall call. If step 274 finds that the down service direction has been selected, step 278 performs a function similar to step 276. Step 280 then compares the floor number of the first call listed in the call table with the floor number in question, to determine if it is related to the floor being analyzed. If not, the hall call table pointer is incremented in step 282 and step 286 checks to see whether all of the calls in the table have been processed. If not, the program returns to step 280. When step 280 finds that the call is associated with the floor being analyzed, step 286 checks to see whether or not the registration time of the call occurred during the period of time to be analyzed. If not, the program returns to step 282. If the call is within the specified time period, the program advances to a program portion which classifies the registration time of the call. For example, step 288 may check to see if the call registration time was within 0–4 seconds. If it was, step 292 would increment a "0–4" counter stored in RAM. The steps may continue to check the registration times of the call in 4 second divisions, setting appropriate counters, with the final step, for purposes of example, determining if the length of the call was within 28–32 seconds. If it was, a "28–32" counter would be incremented. If the call registration time exceeded 32 seconds, step 296 would increment a "greater-than-32" counter. After the registration time has been classified, the program returns to step 282.

When step 284 finds that the call table has been completely processed, it advances to step 298 which prepares the data for viewing or for printing, or for both. The program then exits at 300.

Figure 7:
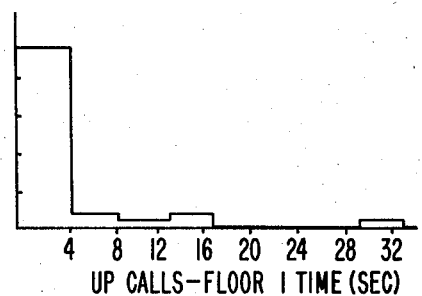
FIG. 7 is a graph bar representative of the analysis displayed or printed from the stored performance data of the elevator system, or of the elevator system simulator, using the program shown in FIG. 6.

FIG. 7 is a bar graph which visually illustrates the results of the program shown in FIG. 6, such as on a CRT screen, by printing a hard copy of the graph, or both. The number of calls per vertical division would be spelled out below the graph, as well as the time of day over which the analysis was made, and the day of the year. It also specifies the call direction and the floor number. The number of calls answered having a wait time within each of the listed four second intervals is set forth in bar graph form.

Figure 8:
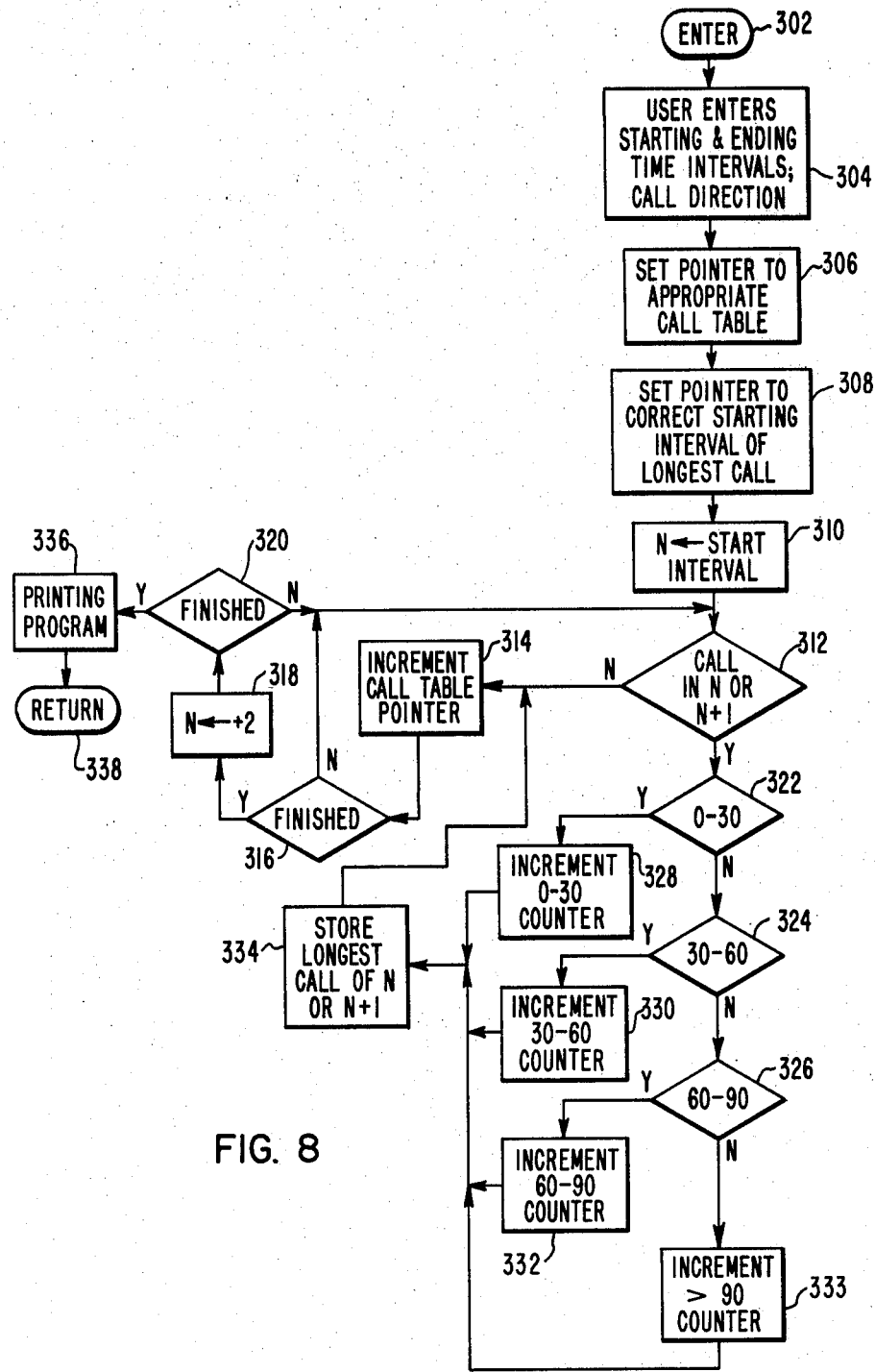
FIG. 8 is a flow chart of a program for preparing a second predetermined analysis of hall calls, with Tables I and II set forth in the specification illustrating exemplary results of this program.

FIG. 8 is a flow chart which illustrates another analysis routine which may be performed. This routine may be performed automatically, or upon user command, as desired. The program is entered at 302 and step 304 examines either the pre-entered data, or the data just entered by the user, which sets forth the starting and ending time intervals, to specify the period of time over which the analysis is to be made, and it would also list the call direction. Step 306 would set the pointer to the top of the appropriate hall call table, and step 308 would also set a pointer to the correct starting interval of the longest call storage shown in FIG. 5. As hereinbefore stated, the 96 fifteen-minute time intervals of a 24-hour day are numbered 0 through 95. Step 310 would set a location N to the number of the starting time interval. Each fifteen-minute interval would be classified, or longer intervals may be classified by checking additional intervals from the interval N. For purposes of example, it will be assumed that thirty-minute periods of time are involved in the classification. Thus, step 312 would check to see if the call at the first location of the call table was registered in time interval N or in time interval N+1. If the call was not registered in either of these fifteen-minute time intervals, step 314 would increment the call table pointer and step 316 would check to see if all of the calls of the call table have been processed. If they have not, the program would return to step 312 which would check the next call listed in the call table. When step 316 finds that all of the calls have been checked relative to the time intervals N and N+1, N would be advanced by two in step 318 in order to check the calls against the next two fifteen minute intervals. Step 320 checks to see if the period of time to be analyzed has been completed. If it has not been completed, the program returns to step 312 to check all of the calls for registration in the new timing intervals. When step 312 finds that the call being examined was registered in the time interval, or intervals being examined, steps 322, 324 and 326 classify the call registration time into one of a group of times, such as 0–30 seconds, 30–60 seconds, 60–90 seconds, or greater than 90 seconds. Step 322, for example, determines if the length of call registration was within 0–30 seconds. If it was, step 328 would increment a "0–30" counter maintained in RAM. In like manner, if step 324 finds that the registration time was within 30–60 seconds, step 330 would increment a "30–60" counter. If step 326 finds the registration time between 60–90 seconds, step 332 increments a "60–90" counter. If the call registration time exceeded 90 seconds, step 326 would advance to step 333 which increments a "greater-than-90" counter. All of the counter incrementing steps advance to step 334 which stores the longest call of the timing interval N, or N+1, currently being investigated. This may be stored in the RAM map shown in FIG. 5, using the format illustrated. The program then returns to step 314. When step 320 finds that the period of time over which the analysis is to be made has been completed, it advances to step 336 which enables the assembled information to be visually displayed on a video monitor, or printed to provide a hard copy of the results.

Tables I and II below illustrate traffic analysis summaries which may be prepared by the program shown in FIG. 8.

TABLE I

TRAFFIC ANALYSIS SUMMARY
UP HALL CALLS

| TIME | 0–30 SEC | 30–60 SEC | 60–90 SEC | >90 SEC | LONG WAIT TIME |
|---|---|---|---|---|---|
| 6–6:30 | 5 | 0 | 0 | 0 | 6 |
| 6:30–7 | 14 | 0 | 0 | 0 | 1 |
| 7–7:30 | 14 | 0 | 0 | 0 | 23 |
| 7:30–8 | 16 | 0 | 0 | 0 | 10 |
| 8–8:30 | 34 | 2 | 0 | 0 | 39 |
| 8:30–9 | 29 | 2 | 2 | 0 | 71 |
| 9–9:30 | 21 | 10 | 3 | 0 | 65 |
| . | . | . | . | . | . |
| 6–6:30 | 14 | 0 | 0 | 0 | 28 |
| 6:30–7 | 10 | 0 | 0 | 0 | 16 |
| 7–7:30 | 10 | 0 | 0 | 0 | 28 |
| 7:30–8 | 5 | 0 | 0 | 0 | 20 |
| 8–8:30 | 17 | 0 | 0 | 0 | 29 |
| 8:30–9 | 17 | 0 | 0 | 0 | 14 |
| Totals | 506 | 96 | 30 | 21 | |

TABLE II

TRAFFIC ANALYSIS SUMMARY
DOWN HALL CALLS

| TIME | 0–30 SEC | 30–60 SEC | 60–90 SEC | >90 SEC | LONG WAIT TIME |
|---|---|---|---|---|---|
| 6–6:30 | 5 | 0 | 0 | 0 | 16 |
| 6:30–7 | 5 | 0 | 0 | 0 | 8 |
| 7–7:30 | 3 | 0 | 0 | 0 | 29 |
| 7:30–8 | 4 | 0 | 0 | 0 | 25 |
| 8–8:30 | 5 | 0 | 2 | 0 | 68 |
| 8:30–9 | 7 | 3 | 0 | 0 | 53 |
| 9–9:30 | 8 | 9 | 0 | 0 | 57 |
| . | . | . | . | . | . |
| 6–6:30 | 21 | 3 | 0 | 0 | 44 |
| 6:30–7 | 9 | 0 | 0 | 0 | 26 |
| 7–7:30 | 19 | 1 | 0 | 0 | 48 |
| 7:30–8 | 5 | 0 | 0 | 0 | 20 |
| 8–8:30 | 9 | 2 | 0 | 0 | 52 |
| 8:30–9 | 8 | 0 | 0 | 0 | 25 |
| Totals | 874 | 190 | 68 | 29 | |

We claim as our invention:

1. A method of evaluating the performance of an elevator system, comprising the steps of:
monitoring predetermined parameters of an operative elevator system,
obtaining and storing data via said monitoring step representative of actual traffic conditions,
obtaining and storing data via said monitoring step representative of the actual response of the elevator system to the stored traffic conditions,
providing a simulator which simulates the operation of an elevator system having the same building configuration, number of elevator cars, and speed of the cars, as the operative elevator system, and which generates data representative of the proper response of the elevator system being simulated in response to traffic conditions applied thereto as inputs,
operating the simulator using the stored data representative of the actual traffic conditions as inputs,
obtaining and storing the data provided by the simulator which is representative of the response of the simulated elevator system to the actual traffic conditions,
and comparing data representative of the actual response of the operative elevator system with the data representative of the response of the simulated elevator system to the same actual traffic conditions, as an aid in evaluating the performance of the operative elevator system.

2. The method of claim 1 wherein the step of providing the simulator includes the step of providing the same dispatching strategy as the operative elevator system, such that the response of the simulated elevator system should be similar to the response of the operative elevator system, to the same traffic conditions, if the operative elevator system is performing properly, to thus aid in the servicing of the operative elevator system.

3. The method of claim 1 wherein the step of providing the simulator includes the step of providing substantially the same dispatching strategy as the operative elevator system, with the difference being a predetermined dispatching strategy it is desired to evaluate.

4. The method of claim 1 wherein the step of providing the simulator includes the step of providing a different dispatching strategy than that of the operative elevator system, to compare the efficacy of different dispatching strategies when operating from the same actual traffic conditions.

5. The method of claim 1 wherein the steps of obtaining and storing data representative of the actual and simulated responses of the operative and simulated elevator systems, respectively, includes the steps of analyzing the data to facilitate comparison thereof.

6. The method of claim 5 wherein the monitoring step includes the monitoring of up hall calls, and the analyzing step prepares waiting times for the up hall calls placed at a predetermined floor over a predetermined period of time.

7. The method of claim 5 wherein the monitoring step includes the monitoring of down hall calls, and the analyzing step prepares waiting times for the down hall calls placed at a predetermined floor over a predetermined period of time.

8. The method of claim 1 wherein the monitoring step includes the step of monitoring each car call, including the floor at which it was placed, and the destination floor.

9. The method of claim 1 wherein the monitoring step includes the step of monitoring the in-service time of each elevator car over a predetermined period of time.

10. The method of claim 1 wherein the monitoring step includes the step of monitoring the time each elevator car spends at a predetermined floor, over a predetermined period of time.

11. The method of claim 1 wherein the monitoring step includes the step of monitoring the time each elevator car is idle, over a predetermined period of time.

* * * * *